United States Patent [19]

Krone et al.

[11] 4,212,149
[45] Jul. 15, 1980

[54] CROP BALING MACHINES

[75] Inventors: Bernard Krone, Spelle; Wilhelm Ahler, Stadtlohn, both of Fed. Rep. of Germany

[73] Assignee: Maschinenfabriken Bernard Krone GmbH, Spelle, Fed. Rep. of Germany

[21] Appl. No.: 919,639

[22] Filed: Jun. 27, 1978

[30] Foreign Application Priority Data

Jul. 2, 1977 [DE] Fed. Rep. of Germany ....... 2730040
Oct. 4, 1977 [DE] Fed. Rep. of Germany ....... 2744548

[51] Int. Cl.² ............................................. A01D 87/00
[52] U.S. Cl. ......................................... 56/341; 100/88
[58] Field of Search ............................. 56/1, 341–343; 100/88, 89, 35, 76

[56] References Cited

U.S. PATENT DOCUMENTS

| 3,974,632 | 8/1976 | Vanderley | 56/341 |
|---|---|---|---|
| 4,009,653 | 3/1977 | Sacht | 100/88 |
| 4,137,697 | 2/1979 | Knapp et al. | 56/341 |

FOREIGN PATENT DOCUMENTS

2602231 7/1977 Fed. Rep. of Germany ............ 56/341

*Primary Examiner*—Russell R. Kinsey
*Attorney, Agent, or Firm*—Jordan and Hamburg

[57] ABSTRACT

A crop baling machine of the kind for producing wound bales has a hollow cylindrical winding compartment having a bottom gap in the compartment cylindrical wall through which the crop is fed by a pick-up device. Conveying rollers then convey the crop to an endless slat conveyor a radially inner run of which is guided at its side edges to sweep round the inner, part cylindrical wall of the compartment. The outer run of the conveyor is guided round the outside of this wall. A rear compartment portion is hinged to open upwardly to release the bale. The construction is relatively simple and robust and requires less power than conventional machines because uniform radial compression of the bale is achieved. Also, dust and particles of crop cannot easily escape from the baling compartment.

24 Claims, 7 Drawing Figures

CROP BALING MACHINES

The present invention relates to crop baling machines for picking up and compressing into bales, agricultural crops, particularly hay, straw and the like, which have been cut and are lying on the ground, and concerns such crop baling machines of the kind for producing wound bales.

In a known crop baling machine for producing wound bales, the winding compartment has a constant volume during the picking up and compressing operation. The peripheral boundary of the compartment consists of a plurality of conveyor rollers, the stationary axes of rotation of which are disposed in an imaginary cylindrical surface surrounding the central axis of the winding compartment. The conveyor rollers, which have their cylindrical surfaces closely adjacent to one another, are set in rotation by drive chains and in turn set the harvested crop, loosely introduced into the winding compartment, into a rotary movement as soon as the winding compartment is full. The bale is formed by this rotary movement, and further harvested crop which is subsequently picked up by the machine is wound firmly around the bale by the conveyor rollers. As the amount of crop in the winding compartment increases, the bale is compressed from the outside inwards, until a predetermined pressure is reached, which signals the finishing of a bale. When the required finishing pressure is reached, the bale can be bound with twine, the winding compartment can be opened and the bale deposited on the ground. Finished bales have a diameter of about 1.80 m and a width of about 1.50 m. Depending on the crop, they weigh, for example, up to 500 kg in the case of straw or up to 850 kg in the case of hay.

This construction of machine is extremely costly and heavy because it requires a plurality of conveying rollers together with bearings for these, and drive means for each roller. The shape of the peripheral surface of the winding compartment, composed as it is of the semi-cylindrical surfaces of the conveyor rollers, produces an uneven pressure on the outer periphery of the growing bale during its rotation, which detracts from the formation of a homogeneously compressed bale. In the case of crops of a dry and breakable or brittle nature, quite considerable losses occur through small particles of the crop falling out of the machine between the conveyor rollers. The shape of the peripheral surface and the fluctuations in pressure furthermore, encourage a comminution of the brittle stalks, such as are present, for example, in the case of dried straw into such small particles. As a result of the numerous gaps between the conveyor rollers also, dust and the like fine particles can escape so that in the case of dried crops, the machine is enveloped in a cloud of dust during its operation.

In a further known crop baling machine for producing wound bales, the peripheral boundary of the winding compartment is formed by a plurality of segments of flat belt drives. With such a construction, the winding chamber has a polygonal cross-sectional shape with the result that; at the beginning, there is an uneven pressure exerted from the outside inwards, and different pressures act on the periphery of the developing bale. Gaps are present between the flat belt segments in this construction, and also between the numerous flat belts making up each segment. Here, too, therefore, dust or the like small particles as well as small pieces of the harvested crop, can escape from the machine during its operation. This construction is also expensive to manufacture because it not only requires about 70 belts but also rollers and guides for these, as well as drive means for each segment of belts. Tensioning means also has to be provided for all of the belts, so as to maintain the particular belt tensions necessary. Maintaining a uniform belt tension in each flat belt segment is a special problem.

The surface of a bale resulting from a wavy shape of the peripheral surface of the winding compartment with conveyor rollers or from the polygonal shape of the peripheral surface with belt segments not only produces the squeezing effect already mentioned, resulting from the action of different pressures with the consequence of increased losses through crumbling, but also requires a greater drive power, while during binding in the winding chamber, the twine follows the course of the surface so that after the bale is deposited on the ground, the binding tends to come loose.

Crop baling machines are also known in which the winding compartment is bounded by flat belt segments which move outwardly to increase the volume of the compartment during the bale-winding process until it finally corresponds to the volume of the finished bale. In these machines, the winding operation of the harvested crop, picked up from swaths, begins practically immediately with the entry of the crop into the winding compartment, the following crop being progressively wound round the periphery of the bale core first formed. With such machines, a bale results having strong consolidation and the compression of the crop in the bale, right through to its core region, is undesirable in the interests of drying the bale, which may be required after its formation and also in the interests of later removing the crop from the bale. The belts, which are guided to yield as the diameter of the developing bale increases, are equalised and acted upon by tensioning devices to compensate for the different effective lengths of belt needed. These devices consist of spring-actuated or hydraulically-actuated belt tensioners. This machine is complicated structurally and has the disadvantage that numerous gaps occur in the boundary of the winding compartment through which material can escape. It is also limited with regard to the compression which it can exert on a bale.

The object of the present invention is to provide a crop baling machine of the kind for producing wound bales which is simply constructed and which may be of low weight compared with prior art machines, but at the same time achieve great capability, and which will wind bales with uniform compression in their outer region and largely avoid or reduce losses through crumbling and work without making an appreciable cloud of dust.

In accordance with the present invention there is provided a crop baling machine of the kind for producing wound bales and comprising a cylindrical bale winding compartment having a part cylindrical boundary wall and a gap at the bottom of the compartment for the introduction into the compartment of crop to be wound into a bale in the compartment and conveying means comprising an endless conveyor for imparting winding movement to crop introduced into said winding compartment through said gap, the conveyor having radially inner and outer runs and having its inner run guided to run in circular fashion around the inside of said part cylindrical boundary wall in a direction away from a rear edge of said gap and towards a front edge of said gap.

The endless conveyor may conveniently comprise a pair of endless drive chains carrying transverse slats, the guide chains passing through part annular guides disposed at the two ends respectively of the winding compartment with the slats running along the inner face of said part cylindrical boundary wall.

A machine in accordance with the present invention is simple to produce. Because of the construction of the winding compartment which is substantially closed, apart from the intake gap, the escape of particles of crop and the development of a dust cloud are avoided. The smoothly curved boundary wall acts on the periphery of the developing bale, after the compressing action begins, with a uniform, radially inwardly directed pressure which can be allowed to rise to a relatively high value compared with prior art machines without overloading any pivot bearings and so on. The conveyor ensures a satisfactory winding movement without disturbing the formation of a practically cylindrical, smooth peripheral surface on the bale. A conveying device in the form of drive chains and transverse slats is extremely robust and structurally simple and in addition it requires comparatively little drive power because a pulsating squeezing action on the bale is avoided.

A specific embodiment of the present invention will now be described by way of example, and not by way of limitation, with reference to the accompanying drawings in which.

The machine illustrated in the drawings consists in detail of a machine frame or chassis 1 which comprises a vehicle frame 21 supported on the ground by a pair of wheels 22, the wheel axle of which is designated at 20. At its front, the vehicle frame has a draft tongue 23 or the like pulling device by means of which the machine can be attached to a towing vehicle, not illustrated, particularly an agricultural tractor. Instead of this construction of the machine as a trailer machine, it can, if desired, be constructed in the form of a self-propelled vehicle, for example.

Figure 3:
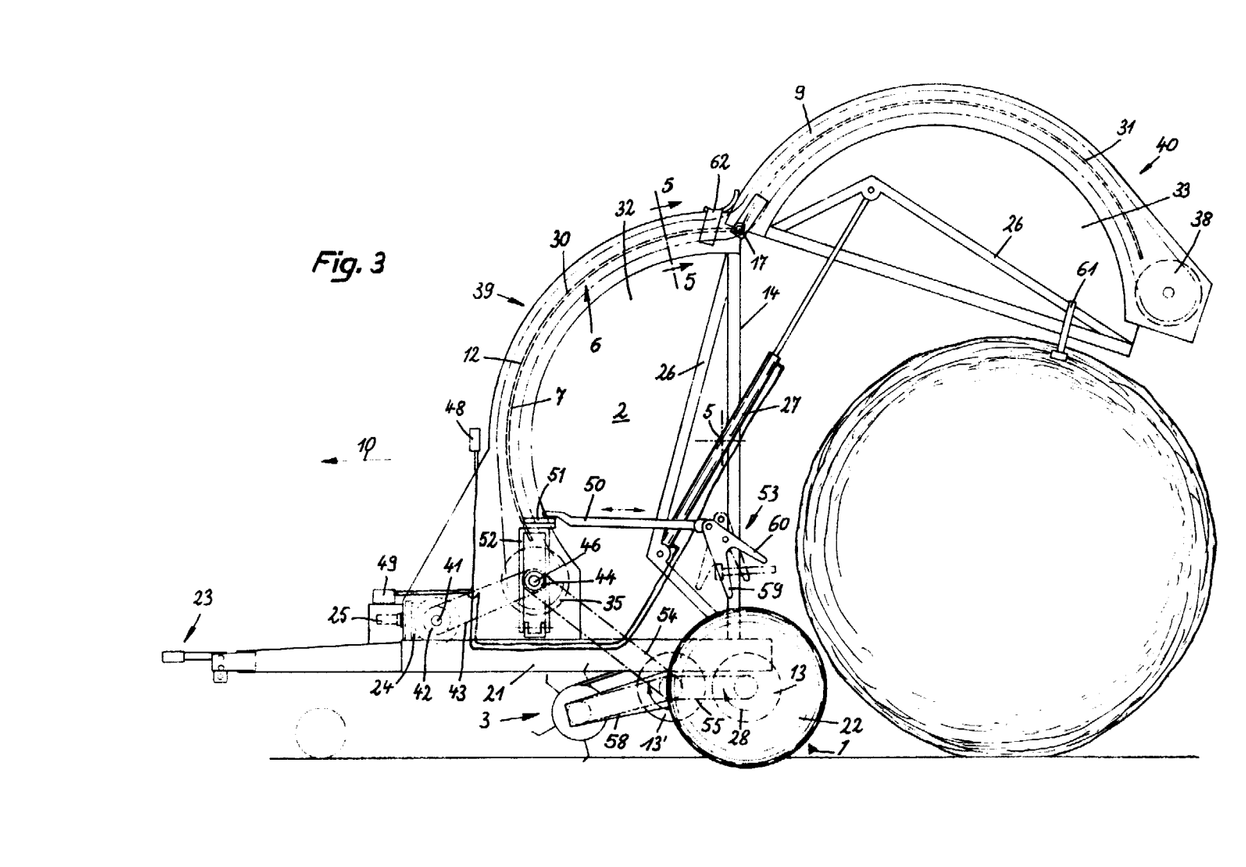
FIG. 3 shows a side view of the machine of FIG. 1 but with the winding chamber open.

The machine frame or chassis 1 carries a winding chamber which defines a winding compartment 2 which is substantially closed on all sides. This winding compartment 2 has the basic shape of a horizontal cylinder with its cylindrical axis 5 extending horizontally and transversely to the direction of travel 10. The flat end faces of the winding compartment 2 are defined by end walls 36 which are parallel to one another and plain or smooth at least on the inside. To permit the winding chamber to be opened, the walls 36 are divided each into two portions and comprise a stationary wall portion 32 and a wall portion 33 which is pivotally movable as seen in FIG. 3. The peripheral surface of the winding compartment 2 is predominantly defined by a substantially cylindrical boundary wall 6 which is fixed between the end walls 36 with its cylindrical axis coincident with the axis 5.

Accordingly, the winding chamber consists of a front part cylindrical chamber portion 39 which is fixed with respect to the vehicle frame 21 and a hinged, rear, part cylindrical chamber portion 40. The two chamber portions meet along a plane 14 which is aligned substantially vertically and intersects the axle 20 or at least lies closely behind the axle with respect to the direction of travel 10. This plane 14 is so situated that the front chamber portion 39 is slightly larger than the rear chamber portion 40.

Figure 1:
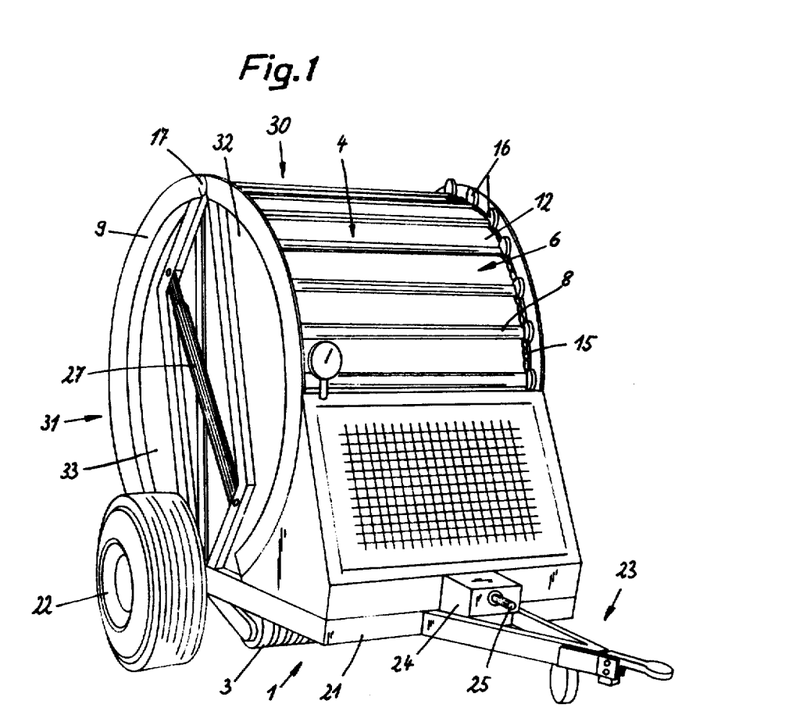
FIG. 1 shows a perspective general view of a crop baling machine according to the present invention.
Figure 2:
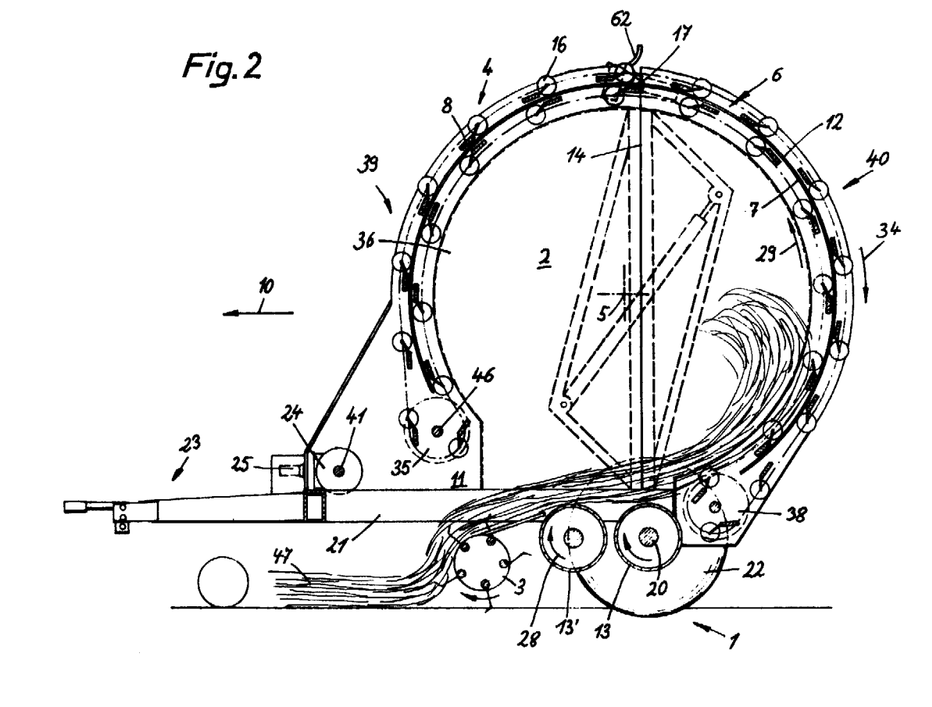
FIG. 2 shows a longitudinal central section through the machine of FIG. 1 with the winding chamber closed.

In the upper region of the dividing plane 14, the chamber portions 39 and 40 are joined together by pivot bearings 17 which define a common hinge pin 19 extending parallel to the cylindrical axis 5 of the winding compartment 2. The pivot bearings 17 allow the rear chamber portion 40 to be swung upwards through about 90°, from its closed position as shown in FIG. 2, to an open position as shown in FIG. 3. This opening movement, and a corresponding opposite closing movement, is brought about by two double-acting pressure-fluid cylinders 27 which are mounted on angle struts 26 on the outside of the side wall portions 32 and 33 of the two side walls 36.

The boundary wall 6 is, of course, correspondingly divided into two part cylindrical portions 30 and 31. The forward portion 30 extends from an intake gap 11 at the bottom of the compartment 2 and which is provided in the front lower region of the machine, and extends upwardly over the full width of the compartment, as far as the dividing plane 14. The rear portion 31 which, when the winding chamber is closed, extends downwardly close to the axle 20 of the wheels 22 and ends at the dividing plane 14, in the lower region thereof.

The intake gap 11 in the front lower region of the winding chamber represents the only opening in the winding compartment 2, and it is through this opening that harvested crops, picked up from the ground, are introduced into the winding compartment. For this purpose, a pick-up device is disposed in front of, and below, the intake gap 11, and in the example illustrated, this device is constructed in the form of a conventional pick-up drum. The harvested crop 47 (see FIG. 2), for example hay or straw, usually lies in swaths on the ground. The crop is picked up by the pick-up device 3 and is fed into the winding compartment 2 by the device. Disposed immediately behind the pick-up device 3, i.e. downstream of the device in the feed direction of the crop 47, are two conveying rollers 13 and 13' which rotate, adjacent to one another, about spindles aligned parallel to the axis 5 of the winding compartment 2. The uppermost peripheral surface portions of the rollers 13 and 13' serve to define uppermost in a common horizontal plane. The conveying rollers 13 and 13' move the crop 47 delivered from the pick-up device 3 and convey it rearwardly with respect to the direction of travel 10 further into the winding compartment. The rollers 13 and 13' extend over the full width of the winding compartment 2 and enable the crop to be spread over the full width of the winding compartment. The rear conveying roller 13 has an axis of rotation coinciding with that of the wheel axle 20 and lies immediately adjacent the dividing plane 14 so as to constitute a low sill over which a finished bale may be released from the winding chamber and deposited on the ground when the chamber portion 40 is opened. The direction of rotation of the conveying rollers 13, 13' is symbolized by the arrows 28. The two conveying rollers 13, 13' are driven in the same direction by means of a chain 55.

The whole inner surface of the boundary wall 6 is swept by a conveying device or endless conveyor 4 which consists in detail of two endless drive chains 15 carrying transverse conveying slats 8. The transverse conveying slats 8 are supported between the two drive chains 15, parallel to one another and with spacing between adjacent slats. The slats 8 are in the form of flat or other differently shaped bars which bear against the inner face 7 of the boundary wall 6 when travelling through the winding compartment 2. A radially inner run of the drive chains 15 pass through part annular guides 9 in the winding chamber and around front guide and drive rollers or sprocket wheels 35 and an outer radial run of the chains pass round rear guide rollers or sprocket wheels 38 to re-enter the guides 9. The direction of movement of the drive chains 15 and hence of the slats 8 in the radially inner and outer runs of the endless conveyor respectively is symbolized by the arrows 29 and 34. As can be seen in particular from FIG. 2, the slats 8 leave the winding compartment 2 at the upper region of the intake gap 11 and enter the winding compartment immediately to the rear of the rollers 13, 13' considered in the direction of travel of the crop 47 as it enters the winding compartment.

Figure 5:
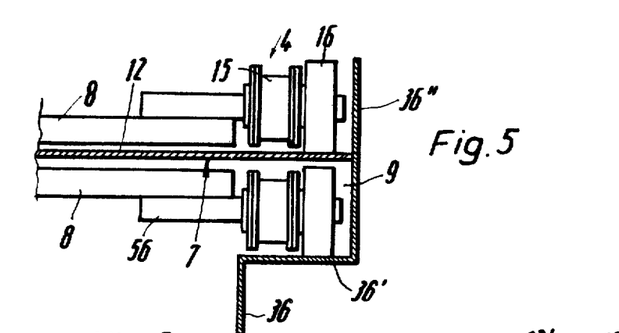
FIG. 5 shows an enlarged sectional view taken on the line 5—5 in FIG. 3.

In the example illustrated, the cylindrical boundary wall 6 made up of the portions 30, 31 itself directly forms one component of the guides 9. The guides 9 are disposed in regions which are outwardly offset in relation to the two end faces of the winding compartment 2 defined by the end walls 36, as can be seen, in particular, in FIG. 5. The guides extend between the sprockets 35 and 38, and are bounded on the outside by the boundary wall 6, at the inside by offset portions 36' of the adjacent end walls 36, the offset portion extending outwardly in the direction of the cylindrical axis 5, and at the end faces by marginal portions 36'' of the end walls which extend radially with respect to the axis 5 of the winding compartment. The outer run of the guide chains travels through a path of movement around the outer face of the boundary wall 6, the chains then being guided by the lateral outer edges of the boundary wall 6, and the radially outer marginal portions 36'' of the end walls 36.

The sprocket chains 15 carry rollers 16 mounted on pivot pins which extend through the chain links and carry the slats 8 at their inner ends. The slats 8 may be engaged directly by the pivot pins but it is preferred that intermediate plates 56 be provided connecting the slats to the pins. In either event it is arranged that the slats 8 lag behind the rollers 16 in the direction of movement of the drive chains 15. As can be seen from FIG. 5, the drive chains 15 and rollers 16 are off-set to the outsides so as to be completely received wholly in the guides 9 and cannot therefore come into contact with a bale being formed in the machine.

The drive chains 15 are driven by the sprocket wheels 35 which are mounted on a horizontal transverse drive shaft 46. As can be seen in detail from FIGS. 3 and 6, the drive to the drive chains 15, to the conveying rollers 13, 13' and to the pick-up device 3, is effected through a centrally disposed gear box 24, the input shaft 25 of which can be connected to the cardan shaft of the towing vehicle and a transverse drive shaft 41 of which carries a drive sprocket wheel 42. The wheel 42 drives an endless chain 43 which in turn drives a double sprocket wheel 44 on a shaft 46. The wheel 44 drives the shaft 46 through a clutch 45 and may free-wheel on the shaft 46 when the clutch is declutched. The double sprocket wheel 44 drives the conveying roller 13' directly through a further endless chain 54 and sprocket wheel, and a further sprocket wheel fixed on the shaft of the roller 13' transmits the drive via an endless chain 55 to drive the conveying roller 13 and a still further sprocket wheel fixed on the shaft of the roller 13' transmits the drive via a chain 58 to drive the pick-up device 3. In this way, the drive for the machine can be engaged and disengaged through the cardan shaft of the towing vehicle from its power take-off and the conveying device 4 can be engaged and disengaged separately through the clutch 45.

In operation, the machine is pulled by its towing vehicle, over the swath of harvested crop 47 which is picked up from the ground by the pick-up device 3 and enters the winding compartment 2 through the intake gap 11. The conveying rollers 13, 13' distribute the crop over the width of the winding compartment 2 and convey it in the direction of the rear portion 31 of the boundary wall 6 to be picked up by the slats 8 running round this wall internally. These slats convey the crop upwards at the back of the winding compartment 2 until the crop overturns i.e. curls forwardly in the direction of travel of the vehicle and winding movement of the crop commences. This winding movement continues and the winding compartment 2 becomes more and more filled with crop. At the moment the winding compartment is filled, compression of the wound crop begins from the outside, radially inwardly because further crop, entering with an unaltered volume of the winding compartment, is wound on the outer periphery of the already formed bale core. The bale, as it increases in density, exerts an increasing outward pressure on the boundary wall 6 during its rotational movement in the compartment 2, tending to force the rear portion 31 of the boundary wall to swing open. The portion 31 is however prevented from opening movement by the action of the pressure-fluid cylinders 27 which, during this operational phase of the machine, have pressure fluid admitted to them in the closing direction. The reaction force of the pressure fluid exerted by the cylinders 27 on the portion 31, preventing it from opening, can be read off on a pressure gauge 48 suitably provided. When this force or pressure reaches a predetermined value, then a bale is appropriately compressed and the picking up process is interrupted by raising the pick-up device in known manner so that its tines no longer pick up the crop. With the drive of the machine continuing, the finished bale is now wrapped round with binding twine by means of a known binding device, not illustrated, after which the bale is ready for ejection onto the ground. By switching the admission of pressure fluid to the opposite end of the cylinders 27, by means of a changeover valve 49, the direction of admission of fluid to the cylinders 27 is reversed, as a result of which the rear chamber portion 40 swings upwards.

As soon as the rear chamber portion 40 begins its opening movement, the drive of the conveying device 4 is interrupted by declutching the clutch 45 so that only the pick-up device 3 (which is ineffective), and the conveying rollers 13, 13' continue to be driven. The latter helps in ejecting the bale. In order to actuate the clutch 45, a small additional pressure-fluid cylinder may be provided, for example, to which fluid is admitted simultaneously with its admission to the pressure-fluid cylinders 27 in the direction to open the rear chamber portion 40. This additional pressure-fluid cylinder acts on the clutch through a toggle-lever 51 and/or a control rocking arm 52. In the example illustrated in FIGS. 2 and 6, a mechanical control device is illustrated instead. In this device, the control rocking arm 52 or the toggle lever 51 is connected, through a control rod 50, with a rocking lever 53 which is secured to the front chamber portion 39 and which comprises two control fingers 59 and 60. These fingers co-operate with a push-rod 61 which is secured to the rear chamber portion 40. When the rear chamber portion 40 begins to open, this push-rod 61 actuates the rear control finger 60 in counterclockwise direction in FIG. 3 with the result that the clutch is declutched via the control rod 50, the toggle lever 51 and the control rocking arm 52. On closing the rear chamber portion 40, the clutch 45 is re-engaged via a reverse sequence of movements of these parts, the push-rod 61 actuating the forward control finger 59.

Figures 6, 7:
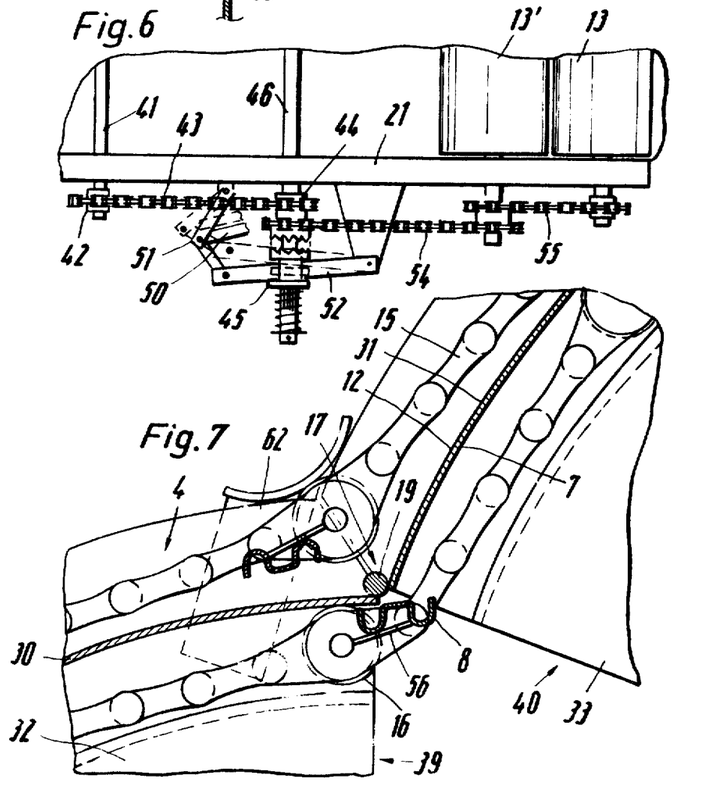
FIG. 6 shows a plan view of a detail of the machine relating to the drive and its switching off.
FIG. 7 shows an enlarged side view of the transition region between the stationary and hinged portion of the winding chamber as an enlarged detail to illustrate the positive guiding of the drive chains in the region of the pivot axis of the chamber portions.

In order to prevent the drive chains 15 from lifting away from the outside of the boundary wall 6 during the raising of the rear chamber portion 40, arcuate guides 62 are disposed above the pivot bearings 17 and above each drive chain 15, as can best be seen in FIG. 7. The drive chains 15 bear against these guides after lifting only slightly from the outside 12 of the boundary wall 6, with the result that the drive chains remain adequately tensioned.

Figure 4:
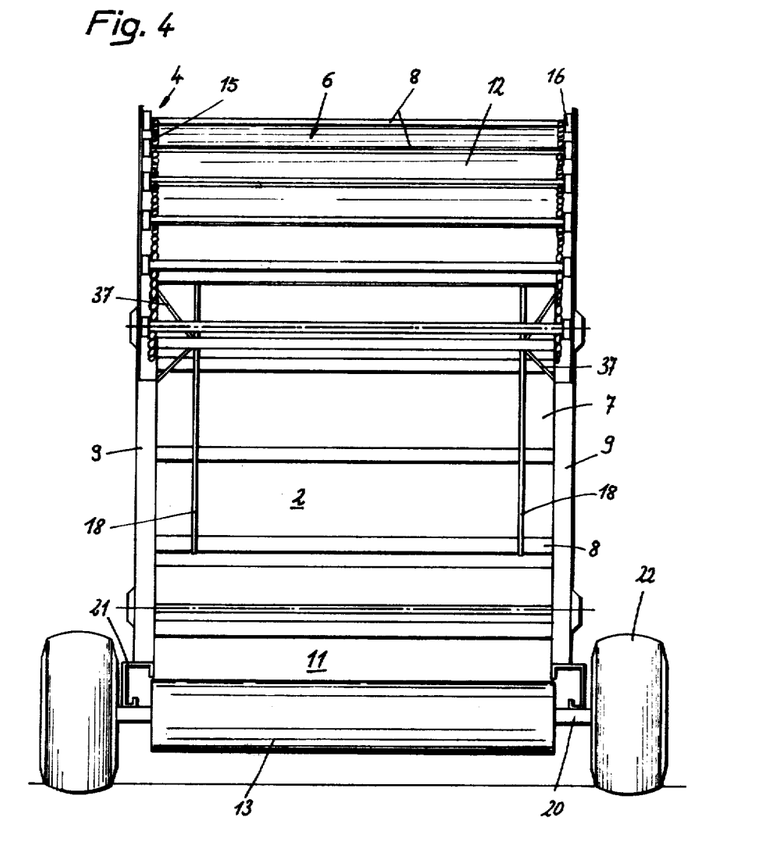
FIG. 4 shows a rear view of the machine of FIG. 1.

In cases where it is desired to reduce the width of the bales, for example, to enable them to be fitted into a given transport vehicle, this can be done by inserting inner auxiliary side walls 18 into the winding compartment, as shown diagrammatically in FIG. 4. These auxiliary side walls are divided in accordance with the division of the winding chamber and are fixed on the side walls 32, 33 at the inside. This can be done by means of distance pins or the like, for example. Provided immediately behind the intake gap 11 and the conveying rollers 13 are transition plates 37 which originate from the side walls 36 and merge into the insertable auxiliary side walls 18. The purpose of these plates is to ensure a transfer of the crop from the intake gap 11, the width of which remains unaltered, into the reduced width winding compartment 2. An additional compression at the end faces of the bale is caused by the transition plates 37.

In the example illustrated in FIG. 4, two auxiliary side walls 18 are inserted. This is preferred for reasons of symmetry, but a width reduction may be effected using only one auxiliary side wall 18 inserted at one side only.

We claim:

1. A crop baling machine of the kind for producing wound bales and comprising a cylindrical bale winding compartment having a part cylindrical boundary wall which terminates at a front edge and a rear edge, said front edge and said rear edge defining a gap means, said gap means being disposed at the bottom of said compartment for the introduction into said compartment of crop to be wound into a bale in said compartment, and an endless conveyor means for imparting winding movement to crop introduced into said winding compartment through said gap means, said conveyor means having radially inner and outer runs extending between said front and rear edges of said gap means and having said radially inner run guided to run in circular fashion around the inside of said part cylindrical boundary wall in a direction away from said rear edge of said gap means and towards said front edge of said gap means to thereby effect winding movement of said crop.

2. A baling machine as claimed in claim 1, in which said winding compartment has end walls, said endless conveyor means comprising a pair of endless drive chains and a plurality of transverse slats, said drive chains carrying said slats, said conveyor means also comprising part annular guides disposed on said end walls, and guide chains passing through said part annular guides with the slats running along the inner face of said part cylindrical boundary wall.

3. A baling machine as claimed in claim 2, wherein said part cylindrical boundary wall forms one component of said part annular guides.

4. A baling machine as claimed in claim 3, wherein said part annular guides are disposed in regions which are offset outwardly in relation to said end wall of the winding compartment.

5. A baling machine as claimed in claim 4, wherein said end walls have offset portions and marginal portions, said part annular guides being bounded at the outside by said part cylindrical boundary wall, at the inside by said offset portions of said end walls and at their ends by said marginal portions of said end walls.

6. A baling machine as claimed in claim 2 comprising guide means for guiding the drive chains along the outer face of said part cylindrical wall in the radially outer return run of the endless conveyor means.

7. A baling machine as claimed in claim 6, wherein said part cylindrical boundary wall has lateral edge portions, said guide means for the return run of said endless conveyor means drive chains comprising said lateral edge portions of said part cylindrical boundary wall and said marginal edge portions of said end walls of the winding compartment, said marginal edge portions projecting radially outwardly of said part cylindrical boundary wall.

8. A baling machine as claimed in claim 2, wherein said drive chains are sprocket chains carrying rollers which run on said part cylindrical boundary wall.

9. A baling machine as claimed in claim 8, wherein said endless conveyor means further comprises pivot pins, said sprocket chain being mounted on said pivot pins, said pivot pins engaging through said sprocket chains and carrying said transverse slats at their inwardly projecting ends.

10. A baling machine as claimed in claim 9 further comprising intermediate plates connecting said transverse slats to said pivot pins, said slats being disposed relative to said pivot pins such that said slats are behind said pivot pins in the direction of movement of said drive chains.

11. A baling machine as claimed in claim 2, wherein said part annular guides have two ends, said endless conveyor means further comprising guide rollers at said two ends respectively of said part annular guides, the rollers at the downstream end of the radially inner run of said endless conveyor means being driven rollers.

12. A baling machine as claimed in claim 11, wherein two pair of said guide rollers are provided, one pair of guide rollers being supported for displacement and location for retensioning said drive chains.

13. A baling machine as claimed in claim 1, wherein said radially inner run of said endless conveyor means exits the winding compartment adjacent said front edge of said gap means.

14. A baling machine as claimed in claim 1, wherein said endless conveyor means further comprises conveying rollers disposed adjacent said rear edge of said gap means, and means for driving said conveying rollers in rotation about axes parallel to the cylindrical axis of said part cylindrical boundary wall, said radially inner run of said endless conveyor means entering said winding compartment adjacent said conveying rollers on the side thereof remote from said front edge of said gap means.

15. A baling machine as claimed in claim 14 further comprising a frame, said bale winding compartment having a part cylindrical portion fixed with respect to said frame and a part cylindrical portion hinged to said fixed portion, said two portions of the compartment joining together in a substantially vertical plane.

16. A baling machine as claimed in claim 15, wherein said part cylindrical boundary wall has lateral edge portions, and guide plates for the drive chains in the region of the hinge axis outwardly of said lateral outer edge portions of said part cylindrical boundary wall.

17. A baling machine as claimed in claim 15, wherein pivot bearings are provided for connecting the two portions of the winding compartment, said pivot bearings being disposed between the radially inner and outer runs of said endless conveyor means.

18. A baling machine as claimed in claim 15, wherein the baling machine is constructed as a trailer vehicle having a single pair of ground engaging wheels and a ground wheel axle, the conveying roller adjacent the upstream end of said radially inner run of said endless conveyor means having an axis of rotation coinciding with that of said ground wheel axle.

19. A baling machine as claimed in claim 14 further comprising a pick-up device for feeding crop from the ground into the winding compartment through said gap means, and a drive means for said endless conveyor means and for said pick-up device, said drive means comprising a gear box adapted to be connected to and driven by a cardan shaft of an agricultural towing vehicle.

20. A baling machine as claimed in claim 19, wherein said drive means for said endless conveyor means is disconnectible when the winding compartment is opened, further comprising a transmission driven from said gear box, and a clutch in said transmission driven from said gear box.

21. A baling machine as claimed in claim 20, wherein a clutch actuating linkage is provided for said clutch actuated by opening and closing movement of the hinged portion of said winding compartment.

22. A baling machine as claimed in claim 14, wherein the effective width of the winding compartment is reduced by the addition of at least one auxiliary end wall inserted into the winding compartment and secured to one of the permanent end walls of the compartment.

23. A baling machine as claimed in claim 22, wherein the part of the auxiliary end wall adjacent to said gap means and said conveying rollers comprises a transition plate for guiding crop delivered by said conveying rollers to said endless conveyor means inside said auxiliary end wall.

24. A crop baling machine for producing wound bales comprising a cylindrical bale winding compartment having a part cylindrical boundary wall which terminates at a front edge and a rear edge, said front edge and said rear edge defining a gap means disposed at the bottom of said compartment, feeding means disposed in said gap means for introducing crop through said gap means into said compartment to be wound into a bale in said compartment, and an endless conveyor means extending between said front and rear edges of said gap means for imparting winding movement to crop introduced into said winding compartment through said gap means, said endless conveyor means comprising endless drive means carrying transverse slats and arranged to have radially inner and outer runs, said radially inner run being guided to run in circular fashion around the inside of said part cylindrical boundary wall from said rear edge of said gap means to said front edge of said gap means to thereby effect winding movement of said crop.

* * * * *